United States Patent
Goel et al.

[11] Patent Number: 5,995,109
[45] Date of Patent: Nov. 30, 1999

[54] METHOD FOR RENDERING HIGH ORDER RATIONAL SURFACE PATCHES

[75] Inventors: Vineet Goel, Santa Clara; Leonardo Vainsencher, San Jose, both of Calif.

[73] Assignee: LSI Logic Corporation, Milpitas, Calif.

[21] Appl. No.: 08/835,501

[22] Filed: Apr. 8, 1997

[51] Int. Cl.$^6$ .................................................. G06T 1/20
[52] U.S. Cl. ..................... 345/423; 345/426; 345/431; 345/441; 345/442
[58] Field of Search .................................. 345/423, 426, 345/431, 442, 441

[56] References Cited

U.S. PATENT DOCUMENTS

| | | | |
|---|---|---|---|
| 4,646,251 | 2/1987 | Hayes et al. | 345/423 |
| 4,890,242 | 12/1989 | Sinha et al. | 345/419 |
| 4,912,659 | 3/1990 | Liang | 345/434 |
| 5,261,029 | 11/1993 | Abi-Ezii et al. | 345/423 |
| 5,278,948 | 1/1994 | Luken, Jr. | 345/423 |
| 5,299,302 | 3/1994 | Fiasconaro | 345/441 |
| 5,428,718 | 6/1995 | Peterson et al. | 345/423 |
| 5,619,626 | 4/1997 | Huddy | 345/421 |

OTHER PUBLICATIONS

Farin, G., *Curves and Surfaces for Computer Aided Geometric Design: A Practical Guide*, Academic Press, 1988, pp. 1–344.

Foley, et al., *Second Edition Computer Graphics: Principles and Practice*, Addison–Wesley Publishing Company, 1990, pp. 201–226, 471–531.

Shantz et al., "Shading Bicubic Patches," Computer Graphics, vol. 21, No. 4, Jul. 1987, pp. 189–195.

Lien et al., "Adaptive Forward Differencing for Rendering Curves and Surfaces," Computer Graphics, vol. 21, No. 4, Jul. 1987, pp. 111–117.

U.S. application No. 08/810,256 filed Mar. 3, 1997.

*Primary Examiner*—Mark R. Powell
*Assistant Examiner*—Kimbinh T. Nguyen
*Attorney, Agent, or Firm*—Conley, Rose & Tayon

[57] ABSTRACT

A method for efficient, high quality rendering of a surface patch. The method tests a surface patch for flatness, and if the surface patch is not flat, the method divides the surface patch into a left surface patch and a right surface patch. Otherwise if the surface patch is flat, the method converts the surface patch into triangles. This method can be implemented to operate recursively, thereby ensuring that all portions of the patch are eventually converted into triangles when the portions become small enough to satisfy the flatness condition. A patch tests as flat only if all curves which form the patch do not deviate from straight lines by more than a predetermined tolerance. The division is efficiently performed by determining (i) left patch control points for a first portion of all curves along one axis of the surface patch, and (ii) right patch control points for a second portion of all curves along said axis of the surface patch. The axis of division preferably alternates, so that the dividing is done along a second axis if patch is not flat along the second axis and a preceding division occurred along a first axis. The method also includes tests for backfaced orientation of the patch and external location of the patch. The patch is discarded if it faces away from the viewpoint or does not appear inside the viewing region.

50 Claims, 8 Drawing Sheets if an edge is linear, corresponding bit is set to one, otherwise to zero.

METHOD FOR RENDERING HIGH ORDER RATIONAL SURFACE PATCHES

BACKGROUND OF THE INVENTION

1. Field of the Invention

This invention relates to the field of methods for converting object representations to images for graphical display systems, and in particular to a method for rendering a surface represented by a set of Bezier patches.

2. Description of the Related Art

There is a growing interest in the graphics, vision, and manufacturing communities to be able to acquire and digitally reproduce the shape and external appearance of objects for the purpose of transmission, display, and numerically controlled fabrication. This would have applications in product design, fast prototyping, reverse engineering, and digitizing shapes for the visual simulation, animation, and entertainment industries. Current advancement in laser range scanners now offers a promising methodology for fully-automated model acquisition of arbitrary objects. Several million points scanned on an arbitrary object can be converted easily into an irregular mesh of polygons. These polygons are then preferably converted into a parametric surface representation, which is a more compact and manipulable form. U.S. patent application Ser. No. 08/810,265 titled "System and method for parametric surface representation of objects using high order surface patches" filed Mar. 3, 1997, and authored by Nishit Kumar et al. provides a fully automated method for converting a polygonal representation into a set of Bezier patches. A method for rendering these patches is now desirable.

A Bezier patch is a two-dimensional Bezier curve. A Bezier curve is defined by the following equation:

$$Q(s) = \sum_{i=1}^{n} g_i \left( \frac{n!}{i!(n-i)!} \right) s^i (1-s)^{n-i}, \quad (1)$$

where $g_i$, $0 \leq i \leq n$, are control points as shown in FIG. 1A. The result is a curve that is formed by a weighted sum of the control points. In cubic form, equation (1) can be represented by the following matrix equation:

$$Q(s) = \begin{bmatrix} s^3 & s^2 & s & 1 \end{bmatrix} \begin{bmatrix} -1 & 3 & -3 & 1 \\ 3 & -6 & 3 & 0 \\ -3 & 3 & 0 & 0 \\ 1 & 0 & 0 & 0 \end{bmatrix} \begin{bmatrix} g_0 \\ g_1 \\ g_2 \\ g_3 \end{bmatrix} = S M G_c, \quad (2)$$

where $G_c$ is a column vector containing the Bezier curve control points. If $G_c$ is parameterized in order to vary as a function of a second coordinate t, this gives the two-dimensional surface:

$$Q(s,t) = S M \begin{bmatrix} G_0(t) \\ G_1(t) \\ G_2(t) \\ G_3(t) \end{bmatrix}. \quad (3)$$

Realizing that for 3rd order Bezier curves, $G_i(t)$ can be expressed in the matrix equation $$G_i(t) = T M G_{ci}, \quad (4)$$

an expanded form of equation (3) can be written $$Q(s,t) = S M \begin{bmatrix} g_{00} & g_{01} & g_{02} & g_{03} \\ g_{10} & g_{11} & g_{12} & g_{13} \\ g_{20} & g_{21} & g_{22} & g_{23} \\ g_{30} & g_{31} & g_{32} & g_{33} \end{bmatrix} M^T T^T. \quad (5)$$

Equation (5) is the matrix form of a bicubic Bezier patch. An example of such a patch is shown in FIG. 1B. Equation (5) is decomposable into three equations of the same form, one equation for each coordinate axis of the control points. For example, equation (5) could be written as $$X(s,t) = S M G_x M^T T^T, \quad (6)$$

$$Y(s,t) = S M G_y M^T T^T, \text{ and} \quad (7)$$

$$Z(s,t) = S M G_z M^T T^T. \quad (8)$$

A generalization of the Bezier patches is often used. A rational Bezier patch has a fourth equation $$W(s,t) = S M G_w M^T T^T, \quad (9)$$

which is used in determining the equation of the points of the surface in the following way: the (x,y,z) points on the surface patch are given by $$\left( \frac{X(s,t)}{W(s,t)}, \frac{Y(s,t)}{W(s,t)}, \frac{Z(s,t)}{W(s,t)} \right) \quad (10)$$

where $0 \leq s, t \leq 1$.

Three properties of Bezier patches are noted here. A Bezier patch is completely contained within the convex hull formed by the control points which define the patch. One exemplary consequence of this is that it may be determined that a patch is not within the screen boundaries if none of the control points is within the screen boundaries. A desired affine transformation (e.g. rotation, translation, magnification) of a Bezier patch may be achieved by applying the transformation to the control points. An exemplary consequence of this is that the transformation may be applied before the patch is rendered, thereby providing a significant decrease in the associated computation. An affine transformation may be applied to the s,t parameters of a Bezier patch without inducing any variation in the patch. These three properties will be used in later discussion.

In addition to the surface coordinates of an object, Bezier patches may be used to represent other aspects of the object. Examples include patches which provide values for the normal to the surface (N), the direction of the light source (L), the direction of reflected objects (R), and the surface color (RGB). Each of these patches must also be rendered during the rendering of the surface to provide a variety of special effects.

The usage of Bezier patches advantageously provides a method for compact, high-quality representation of objects. This method also allows for efficient execution of affine transformations on the object. It is desirable to have a method for converting Bezier patches into sets of triangles or other polygons for which established graphics rendering hardware exists.

SUMMARY OF THE INVENTION

The problems outlined above are in large part solved by a method for efficient, high quality rendering of a surface patch. The method tests a surface patch for flatness, and if the surface patch is not flat, the method divides the surface patch into a left surface patch and a right surface patch. Otherwise if the surface patch is flat, the method converts the surface patch into triangles. This method can be implemented to operate recursively, thereby ensuring that all portions of the patch are eventually converted into triangles when the portions become small enough to satisfy the flatness condition. A patch tests as flat only if all curves which form the patch do not deviate from straight lines by more than a predetermined tolerance. The division is efficiently performed by determining (i) left patch control points for a first portion of all curves along one axis of the surface patch, and (ii) right patch control points for a second portion of all curves along said axis of the surface patch. The axis of division preferably alternates, so that the dividing is done along a second axis if patch is not flat along the second axis and a preceding division occurred along a first axis. The method also includes tests for backfaced orientation of the patch and external location of the patch. The patch is discarded if it faces away from the viewpoint or does not appear inside the viewing region.

In one embodiment, the present invention uses attribute patches for determining the color, reflection, lighting, and texture of patches. The attribute patches are manipulated in the same manner as the surface patch, but an additional test is performed. The method tests the surface patch for flatness and tests the surface patch for linearity of shading. If the surface patch is not flat or is not linearly shaded, the method divides the surface patch into a left surface patch and a right surface patch. If the surface patch is flat and linearly shaded, the method converts the surface patch into triangles. The testing for linearity of shading determines that the shading of the surface patch is linear only if all curves which form the color attribute patch do not deviate from straight lines by more than a predetermined tolerance.

BRIEF DESCRIPTION OF THE DRAWINGS

Other objects and advantages of the invention will become apparent upon reading the following detailed description and upon reference to the accompanying drawings in which.

Figure 1A:
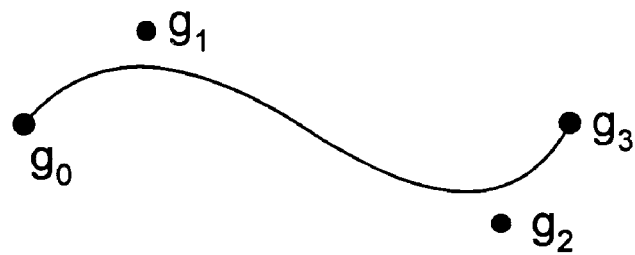
FIG. 1a shows an example of a cubic Bezier curve having four control points.
Figure 1B:
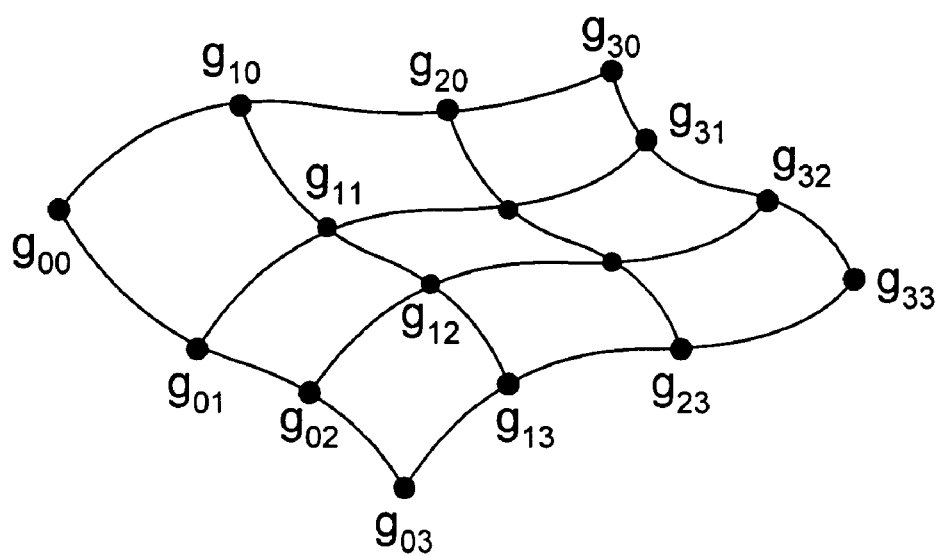
FIG. 1b shows an example of a bicubic Bezier patch having sixteen control points.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling withiu the spirit and scope of the present invention as defined by the appended claims.

DETAILED DESCRIPTION OF THE INVENTION

The following references are hereby incorporated by reference as though entirely and completely set forth herein:

E. Catmull, *A Sub-division algorithm for computer display of curved surfaces*, Computer Science, University of Utah, UTEC-CSc-74-133, December 1974.

G. Farin, *Curves and surfaces for CAGD, a practical guide*, Academic Press, 1992.

J. D. Foley, et al., *Computer graphics, principles and practice*, Addison Wesley Publishing Company, 1990.

S. Lien, M. Shantz, and V. Pratt, "Adaptive forward differencing for rendering curves and surfaces, Computer Graphics," vol. 21, no. 4, July 1987, pp. 111–117.

M. Shantz and S. Lien, "Shading bicubic patches," Computer Graphics, vol. 21, no. 4, July 1987, pp. 189–196.

Alan Watt and Mark Watt, *Advanced animation and rendering techniques, theory and pracice*, Addison Wesley Publishing Company, 1992.

Figure 2A:
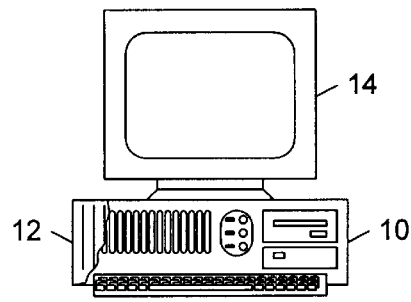
FIG. 2A, FIG 2B shows a computer system which graphically renders surface patches.
Figure 2B:
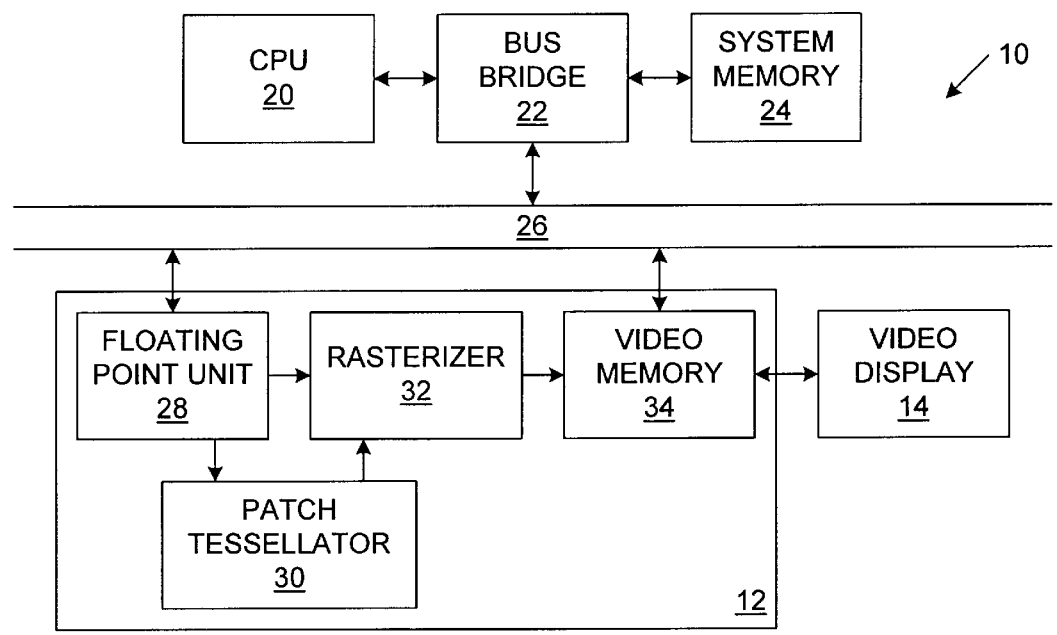

FIG. 2a shows a computer system 10 having a graphics display card 12 which is connected to a graphics display 14. As shown in FIG. 2b, graphics display card 12 includes a floating point unit 28, a patch tessellator 30, and a rasterizer 32. These units are coupled together to implement a graphics rendering pipeline, as will be discussed further below. Computer system 10 also includes a CPU 20, a bus bridge 22, a system memory 24, a bus 26, and video memory 34. During the course of operation, computer system will display objects on display 14 via video memory 34. These objects may be represented in the form of Bezier surface patches. Graphics display card 12 operates to render these Bezier surface patches according to the present invention.

It is noted that computer system 10 is programmable and that in one embodiment, instructions for configuring computer system 10 to operate as described herein may be stored in read-only memory (not shown) or on a storage medium (also not shown). These instructions would then be retrieved and transferred to a processing unit which would then perform the function of patch tessellator 30.

Figure 3:
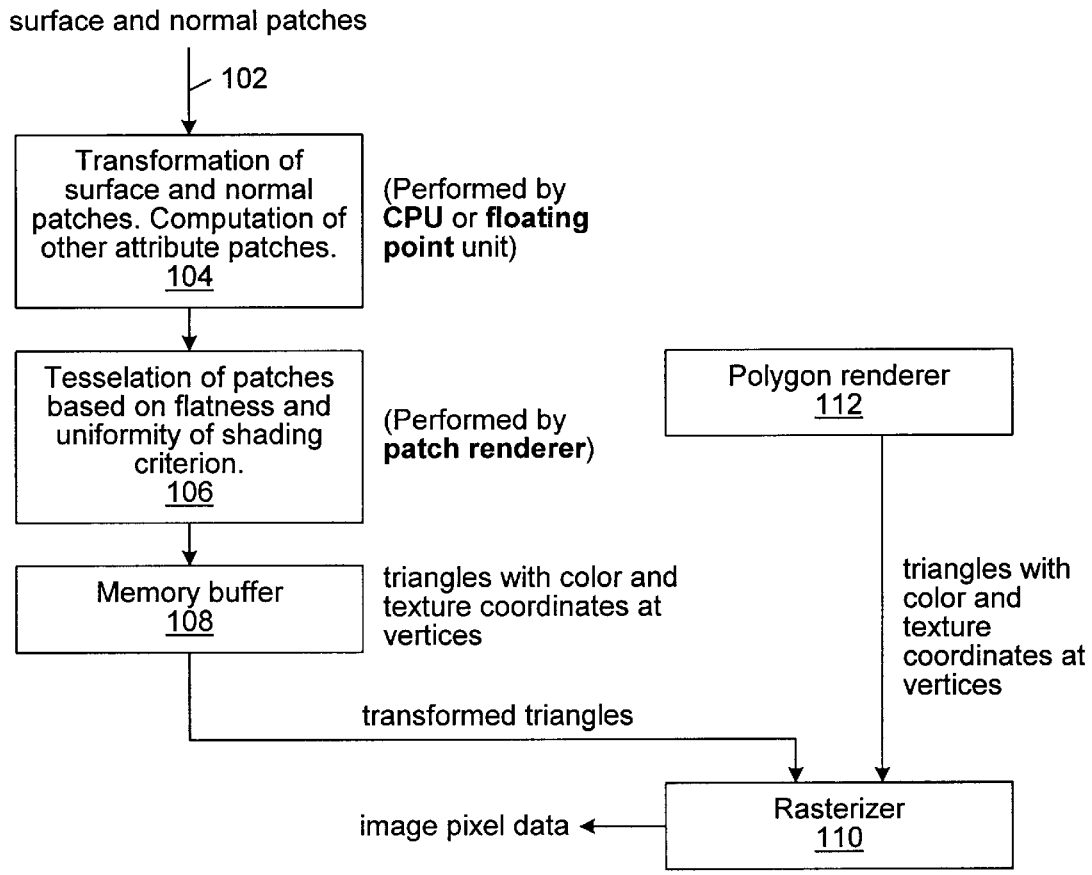
FIG. 3 shows a functional schematic of a graphics rendering pipeline using a method for rendering surface patches.

In FIG. 3, a rendering pipeline 100 for rational Bezier patches is shown. This rendering pipeline implements a method for converting rational Bezier patches describing the surface of an object, hereafter called surface patches, into a set of triangles. Associated with the surface patches are various attribute patches, e.g., normal patches, RGB patches, half-vector patches, light patches, and reflection vector patches. Normal patches indicate the direction of the normal to the surface patch at each point. RGB patches indicate the color of the patch at each point. Both normal and RGB patches are invariant, and may be predetermined and provided along with the surface patches as input. Half-vector patches are an average of the viewing vector and the normal vector at each point on the surface patch. Light patches indicate the direction of incident light at each point on the surface patch. Reflection patches indicate the reflection vector at each point on the surface patch. Half-vector, light vector, and reflection vector patches are dependent on the viewing angle, and must be computed after the orientation transformation has been applied to the surface and normal patches.

Rendering pipeline 100 receives surface, normal, and RGB patches 102 at functional block 104. The operations of functional block 104 are preferably performed by a CPU or floating point unit, and the operations include: (i) transforming the surface patches to provide a desired perspective, (ii) transforming the normal patches associated with the surface patches, (iii) computing attribute patches for reflection vectors, diffuse color and halfway vector, and (iv) clipping surface patches and corresponding attribute patches such that surface patches fit within 1+$\epsilon$ times height and width of viewing screen, where $\epsilon$ is a predetermined fraction of the screen dimensions. As mentioned in the background section, the transformations (i) and (ii) may be applied to the patch control points. The computation of the attributes patches may be performed from the surface patch using Coon's patch as will be described further below. The clipping operations (iv), which are performed to facilitate fixed point computations in functional block 106, are preceded by a location test which may use the convex hull property of the Bezier patch control points. As output, finctional block 104 provides transformed (and clipped if appropriate) surface and attribute patches. These patches are forwarded to functional block 106.

The operations of functional block 106 include: (i) culling and clipping of surface patches and the corresponding attribute patches, (ii) flatness and linearity of shading tests, (iii) tessellations of patches, and (iv) computation of coordinates and normal at comers of patches. In functional block 106 the patches are tessellated into a set of triangles, based on flatness and linearity of shading, as will be described further below. Also in functional block 106, culling and clipping operations are applied to the surface and attributes patches, so that patches which are back-faced or not visible are discarded. The result of the tessellation operations of finctional block 106 is a list of triangles with color and texture coordinates at the vertices, and this result is stored in memory buffer 108, and thereafter forwarded to rasterizer 110. Rasterizer 110 also accepts triangles with color and texture coordinates at the vertices from a polygon tessellator 112. Rasterizer 100 then provides a sequence of image pixel data suitable for display.

Figure 4:
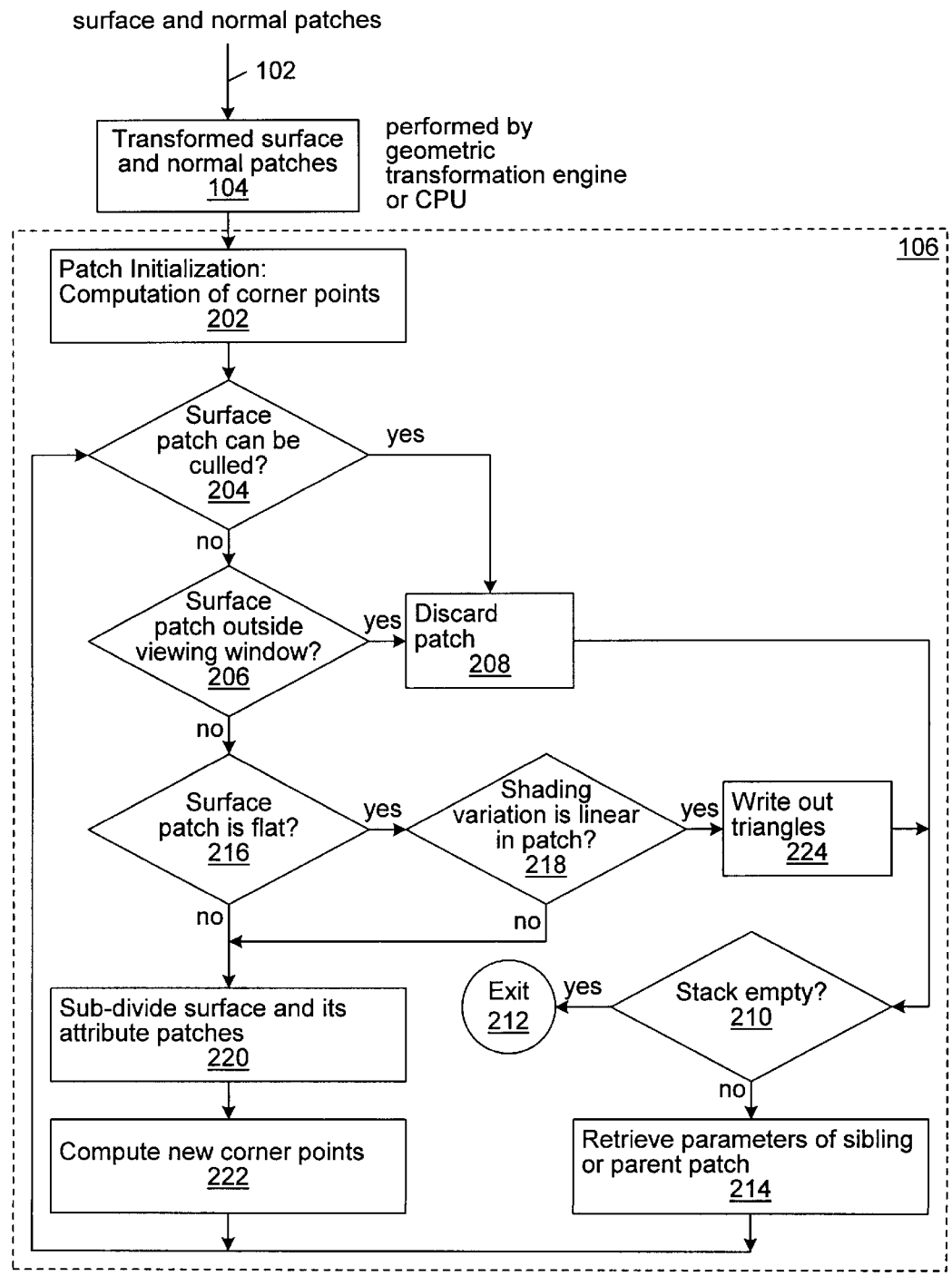
FIG. 4 shows a flowchart of the method for rendering surface patches.

Turning now to FIG. 4 where a flowchart of the rendering method is shown, the operations of functional block 106 are discussed in greater detail. In functional block 106, the method begins with step 202 where the comer points of the original patch are computed. After this step, the term patch is used to refer to both the original patch (the first iteration) and to subpatches of the original patch (in any subsequent iterations). In step 204 a test is made to determine if the patch can be culled, i.e. if the patch is back-faced, and in step 206, a test is made to determine if the patch is outside the viewing window. If the answer to either of these is true, then in step 208 the patch is discarded. After the discard, in step 210, a test is performed to determine if any subpatches are in the stack. If not, the method concludes in step 212 having completely rendered the original patch. If there are subpatches in the stack, then in step 214 the subpatch parameters are retrieved, and the method returns to step 204.

If both the tests in steps 204, 206 are false, then in step 216 atest is made to determine if the patch is flat, and in step 218 a test is made to determine if the shading of the patch has a linear variation. If either test is false, i.e., if the surface patch is not flat and/or the shading variation is not linear in pitch, then in step 220 the patch is subdivided (along with the associated attribute patches). After the patch is subdivided in step 220, in step 222 new comer points for the subpatches are calculated, and one of the subpatches is placed on the stack. The method then returns to step 204 with the remaining subpatch. If both tests in steps 216, 218 are true, i.e., the surface patch is flat and the shading variation is linear in pitch, then in step 224 then patch is divided into triangles and written out. The method then proceeds to step 210 where, as discussed before, a test is made to determine if the stack is empty.

Figure 5:
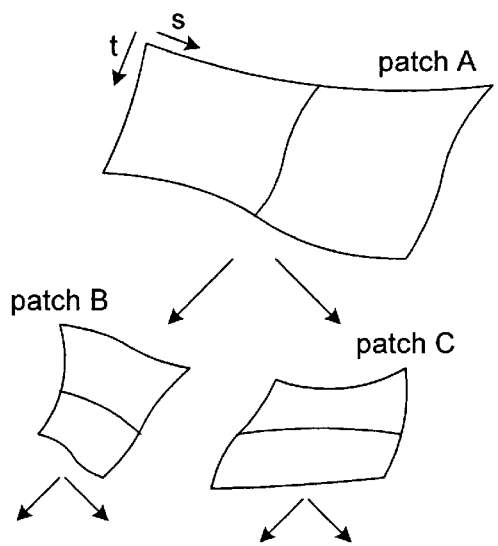
FIG. 5 illustrates a patch subdivision process.

A patch is considered flat if all the curves forming the patch are straight lines within a given user specified tolerance bound. Similarly, a patch is considered linearly shaded if all the curves forming the RGB patch are straight lines within a given user specified tolerance bound. If the flatness or linear shading condition is not satisfied, the patch is subdivided along the s or t direction. The subdivision process for a patch is shown in FIG. 5. Operations and computations performed in the rendering pipeline are now individually discussed in greater detail.

Patch Subdivision

In FIG. 5, patch A is subdivided along s direction into left patch B and right patch C. Patch B is called a left child of patch A while patch C is called a right sibling of patch B. Patch A is called a parent of patches B or C. Similar operations are performed for patch B and C. When a patch meets flatness and linearity of shading criteria, the patch is divided across any two diagonal corners to form triangles. These triangles are then written out, i.e. the spatial and color coordinates of the triangles are forwarded to the memory buffer and from there to the rasterizer. Once a patch is written out in the form of triangles, its right sibling is generated. For example, once patch B is written out, patch C (right sibling of B) is then generated. Once patch C is also written out in the form of triangles, the triangles representing patches B and C may be combined to form patch A. This completes tessellation of patch A as both subpatches B and C have been written out in the form of triangles. The above described process is repeated recursively for all the patches.

Figure 6:
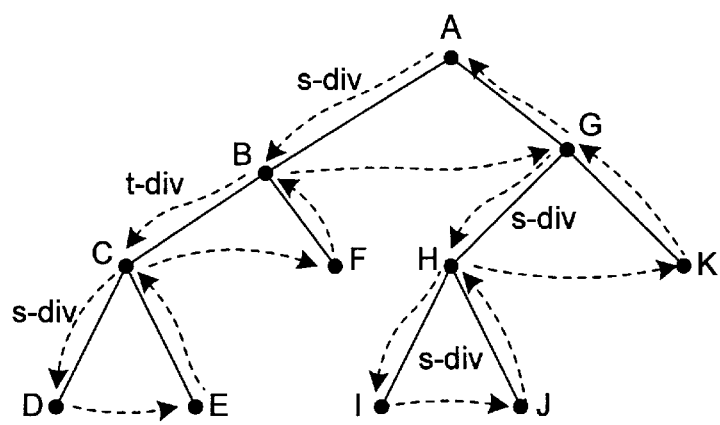
FIG. 6 shows a patch subdivision tree.

A typical subdivision process is shown in the form of subdivision tree in FIG. 6. The order of traversal of tree is:

$$A \rightarrow B \rightarrow C \rightarrow D \rightarrow E \rightarrow C \rightarrow F \rightarrow B \rightarrow G \rightarrow H \rightarrow I \rightarrow J \rightarrow H \rightarrow K \rightarrow G \rightarrow A$$

Preferably, the subdivision direction alternates, e.g. s, then t, then s. However, once a patch has been determined to be flat in one direction, it is no longer subdivided in that direction, i.e. if a patch is flat in the s direction, it is not thereafter subdivided in the s direction. Rather, all subdivisions will be in the t direction until the t direction has also been determined to be flat In FIG. 6, patches A, C, G, H are subdivided along s direction and patch B is subdivided along t direction.

Figure 7:
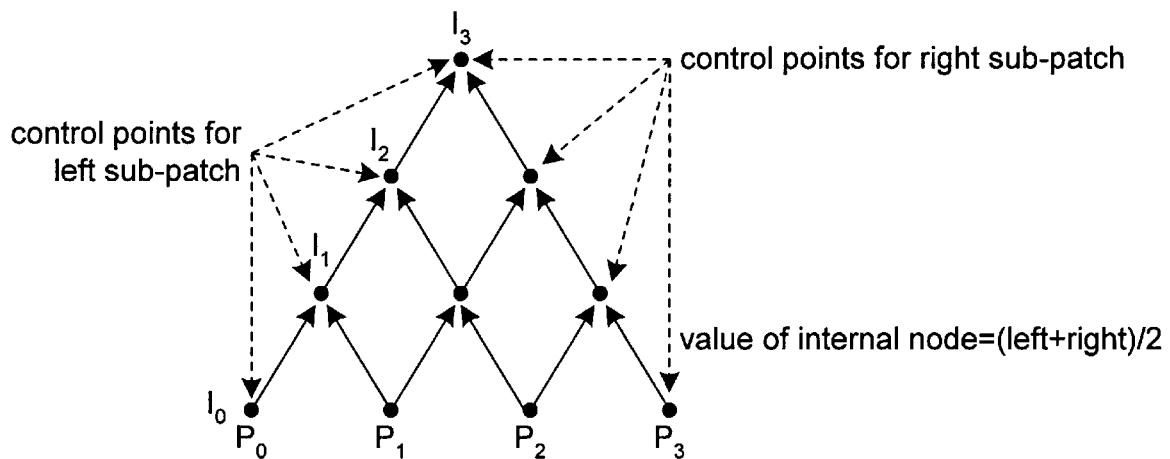
FIG. 7 illustrates a de Casteljau technique for performing a patch subdivision.

A subdivision process for bicubic patches is now described. A bicubic patch is formed by four cubic curves. Subdividing a bicubic patch is equivalent to subdividing each of the four cubic curves. A subdivision process based on the de Casteljau algorithm is described in FIG. 7. This algorithm can be derived from the affine transform properties of Bezier patches. Here, $p_0$, $p_1$, $p_2$ and $p_3$ are the four control points of original cubic curve and $l_0$, $l_1$, $l_2$ and $l_3$ are the four control points of subdivided left cubic curve. A value is determined at each node by taking the average of the two inputs. These operations result in the following control point values for the cubic curves of the left child.

$$l_0 = p_0, l_1 = \frac{p_0 + p_1}{2}, l_2 = \frac{p_0 + 2 \cdot p_1 + p_2}{4}, l_3 = \frac{p_0 + 3 \cdot (p_1 + p_2) + p_3}{8}$$

It is noted that for fixed point representation of control points, these equations indicate that the 0, 1, 2 and 3 least significant bits of $l_0$, $l_1$, $l_2$, and $l_3$, respectively, can be stored in the stack. These bits can then be retrieved from the stack and attached to the least significant positions of the left child control points before computing the control points of the right sibling as described next.

Figure 8:
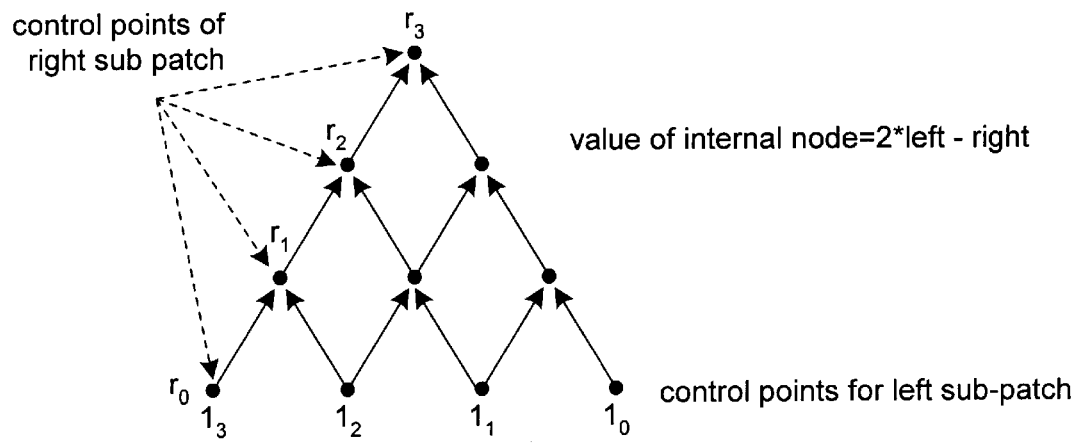
FIG. 8 illustrates a variation of the de Casteljau technique which may be used to determine the control points of a right sibling subpatch.

Turning to FIG. 8, a method is described for determining the right sibling control points $r_0$, $r_1$, $r_2$, and $r_3$, from left child control points $l_0$, $l_1$, $l_2$, and $l_3$. A value is determined at each node by doubling the left input and subtracting the right input. These operations result in the following control point values for the cubic curves of the right sibling.

$$r_0 = l_3, r_1 = -l_2 + 2 \cdot l_3, r_2 = l_1 - 4 \cdot (l_2 - l_3), r_3 = -l_0 + 6 \cdot l_1 - 12 \cdot l_2 + 8 \cdot l_3$$

Figure 9:
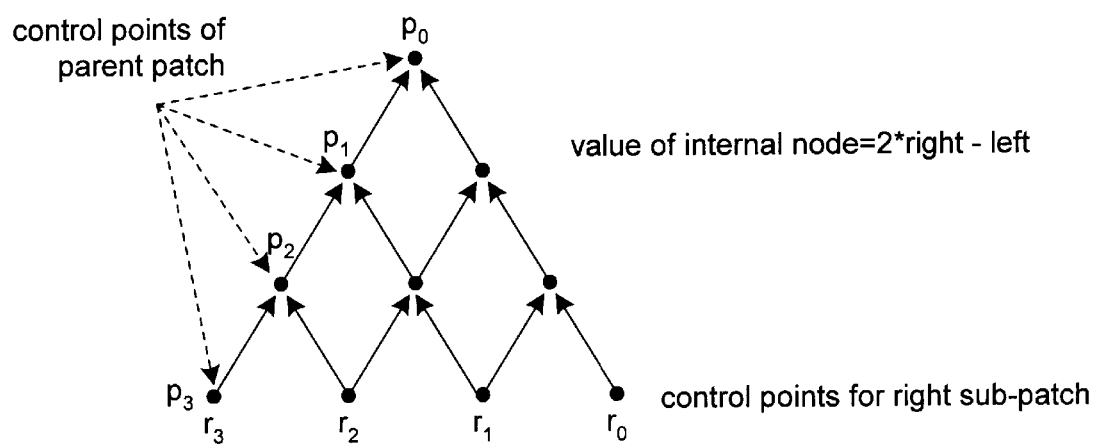
FIG. 9 illustrates a variation of the de Casteljau technique which may be used to determine the control points of a parent surface patch.

The above operations are performed after returning precision bits from the stack to the least significant positions of the left sibling control points. After these operations, the 3, 2, 1, and 0 least significant bits of $r_0$, $r_1$, $r_2$, and $r_3$, respectively, may be stored in the stack to be used later for computing the parent patch if necessary (e.g. to regenerate the control points for the parent patch so that the control points for the as-yet-unrendered right sibling of the parent patch may be obtained). The control points of the parent patch can be obtained from the control points $r_0$, $r_1$, $r_2$, and $r_3$, of the right sibling using computations as described by FIG. 9. A value is determined for each of the nodes by doubling the right input and subtracting the left input. These operations give following values for the control points of the parent patch.

$$p_3 = r_3, p_2 = -r_3 + 2 \cdot r_2, p_1 = r_3 - 4 \cdot (r_2 - r_1), p_0 = -r_3 + 6 \cdot r_2 - 12 r_1 + 8 \cdot r_0$$

Figure 10:
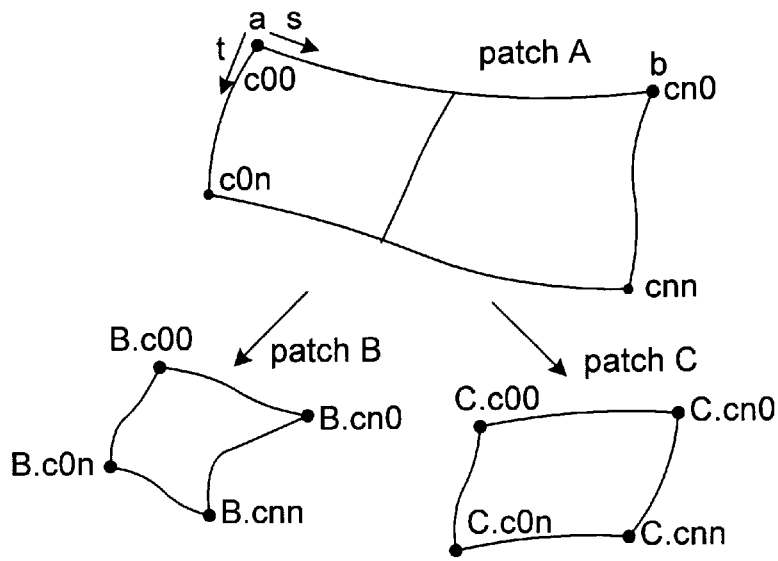
FIG. 10 illustrates the relationships between corner points of a parent surface patch and the right and left subpatches.

The subdivision process requires that, in addition to the control points, the coordinates and normals of the new corner points of the patches be computed. This is done as follows. If the coordinates of the corner points of patch A are $A.C_{00}$, $A.C_{0n}$, $A.C_{n0}$, and $A.C_{nn}$ as shown in FIG. 10, and the normals are $A.N_{00}$, $A.N_{0n}$, $A.N_{n0}$, and $A.N_{nn}$, then after a subdivision along s, the new corner points are now $B.C_{00} = A.C_{00}$, $B.C_{0n} = A.C_{0n}$,
$B.C_{n0} = C.C_{00}$, $B.C_{nn} = C.C_{0n}$,
$C.C_{n0} = A.C_{n0}$, and $C.C_{nn} = A.C_{nn}$.

Similarly, the normals are $B.N_{00} = A.N_{00}$, $B.N_{0n} = A.N_{0n}$,
$B.N_{n0} = C.N_{00}$, $B.N_{nn} = C.N_{0n}$,
$C.N_{n0} = A.N_{n0}$, and $C.N_{nn} = A.N_{nn}$.

Therefore, only two new corner points are computed for each subdivision. Since patch B may be tessellated (i.e. subdivided) further, the corner points of patch C are pushed into stack which are retrieved when the tessellations of patch B have been completed and patch C is ready to be computed for tessellations. If patch A is subdivided along t direction, the corner points are now $B.C_{00} = A.C_{00}$, $B.C_{n0} = A.C_{n0}$,
$B.C_{0n} = C.C_{00}$, $B.C_{nn} = C.C_{n0}$,
$C.C_{0n} = A.C_{0n}$, and $C.C_{nn} = A.C_{nn}$.

Similarly, the normals are $B.N_{00} = A.N_{00}$, $B.N_{n0} = A.N_{n0}$,
$B.N_{0n} = C.N_{00}$, $B.N_{nn} = C.N_{n0}$,
$C.N_{0n} = A.N_{0n}$, and $C.N_{nn} = A.N_{nn}$.

Figure 11:
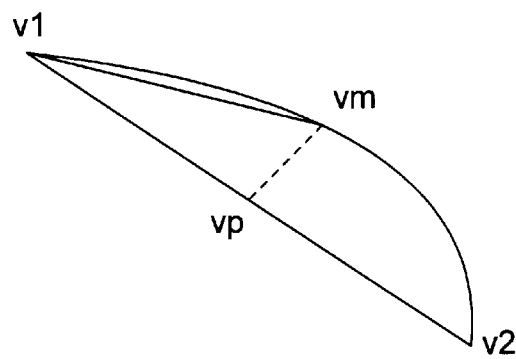
FIG. 11 illustrates a subdivision of a line which has been classified as straight.

If an edge is classified as linear, the new corner points may be computed as shown in FIG. 11. The curve v1,vm,v2 is presumed to be linear. The new corner point vp corresponding to vm is computed as $$vp = \text{frac} \cdot (v2 - v1) + v1$$

where $$\text{frac} = ((v2 - v1) \cdot (vm - v1)) / |v2 - v1|$$

Patch Flatness

Figure 12:
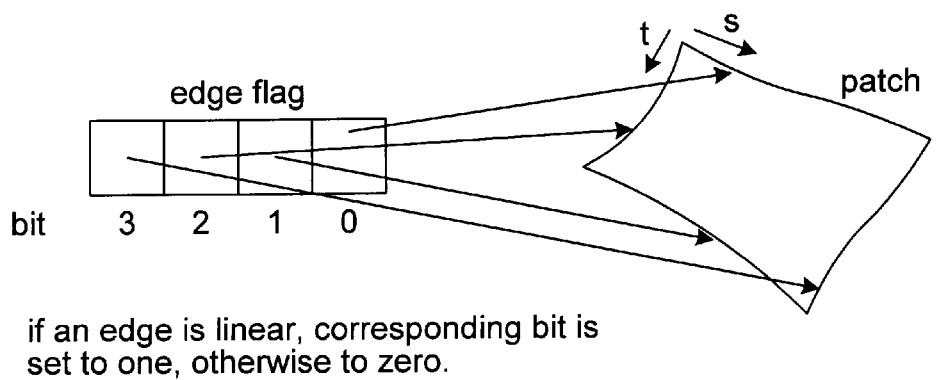
FIG. 12 illustrates a method for storing flags indicative of the straightness of base edges for a surface patch.

A 4-bit flag called an edge flag is used to store linearity classification of edges for a patch. The bits of the edge flag may be associated with specific edges of a patch as shown in FIG. 12. After a subdivision along the s direction, the edge flag for the left child is initialized from the parent edge flag according to edge&0111. Similarly, for the right child, the edge flag is initialized according to edge&1011. For subdivision along the t direction, the edge flag for the left child is initialized to edge&1101, and for the right child edge&1110. Three bits of the edge flag are thereby determined, and the fourth bit which corresponds to the new edge is set according to the results of a straightness test. Since the left child may be tessellated further the edge flag for the right child is pushed into stack.

Figure 13:
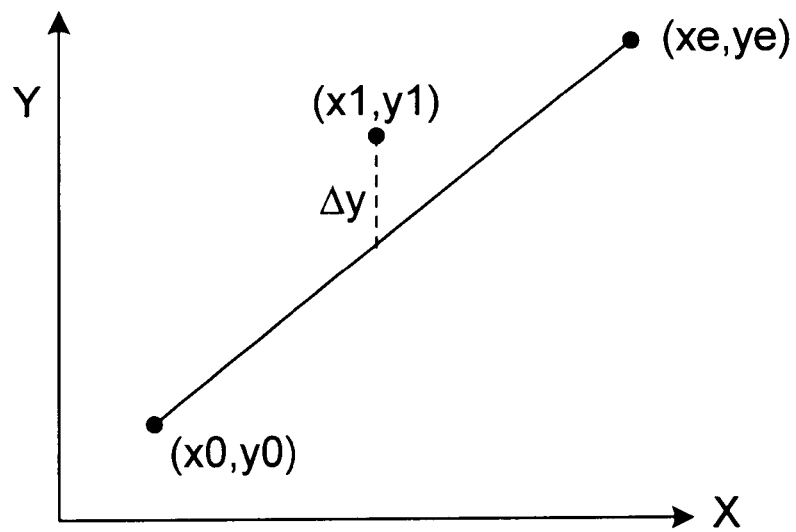
FIG. 13 illustrates a test for straightness of an edge.

If all the curves of a given patch satisfy the straightness criterion, the given patch is classified to be flat. The straightness criterion is now described. FIG. 13 shows a two-dimensional example. The distance $\Delta y$ of a point $p = (x_1, y_1)$ from line $s_0 s_e$ along y direction is given by following expression.

$$\Delta y = \frac{(y_1 - y_0) \cdot (x_e - x_0) - (y_e - y_0) \cdot (x_1 - x_0)}{(x_e - x_0)}$$

If the resolution in Y direction is $T_y$, for $(x_1, y_1)$ to be approximately on the line, following condition should be satisfied.

Figure 14:
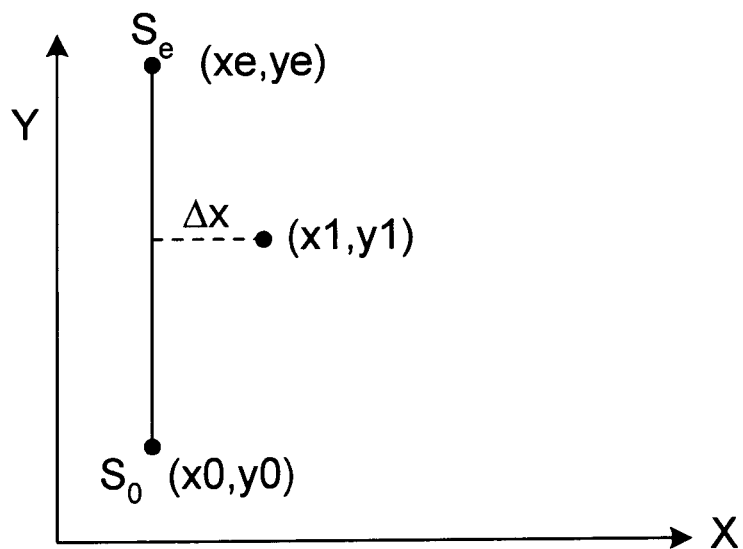
FIG. 14 illustrates an alternate test for straightness of an edge.

$|\Delta y| \leq T_y$ or $|(y_1 - y_0) \cdot (x_e - x_0) - (y_e - y_0) \cdot (x_1 - x_0)| \leq T_y \times |(x_e - x_0)|$ When line $s_0 s_1$ is parallel to Y-axis as shown in FIG. 14, both sides of the above expression become zero. In this case, the distance $\Delta x$, is calculated according to the following expression.

$$\Delta x = \frac{(x_1 - x_0) \cdot (y_e - y_0) - (x_e - x_0) \cdot (y_1 - y_0)}{(y_e - y_0)}$$

If the resolution in X direction is $T_x$, then for $(x_1, y_1)$ to be approximately on the line, the following condition should be satisfied.

$|\Delta x| \leq T_x$ or $(y_1 - y_0) \cdot (x - x_0) - (y_e - y_0) \cdot (x_1 - x_0)| \leq T_x |(y_e - y_0)|$ A Bezier curve is completely contained within the convex hull of its control points. Hence if all the control points are less than a given distance away from a line connecting the endpoints, then every point on the curve is less than this distance away from the line. Applying the above comparisons using the intermediate control points (i.e. the control points which are not also end points) consequently yields a useful straightness test.

In general, the above conditions for straightness test of a curve may be written as follows.

if $|x_e-x_0|>|y_e-y_0|$ then
$$|(y_1-y_0)\cdot(x_e-x_0)-(y_e-y_0)\cdot(x_1-x_0)| \leq T_y \times |(x_e-x_0)|$$
else
$$|(y_1-y_0)\cdot(x_e-x_0)-(y_e-y_0)\cdot(x_1-x_0)| \leq T_x \times (y_e-y_0)$$

For the 3D case, for a point $(x_1,y_1,z_1)$ to be approximately on the line joining points $(x_0,y_0,z_0)$ and $(x_e,y_e,z_e)$, the following conditions are satisfied.

if $|x_e-x_0|>|y_e-y_0|$ then
$$|(y_1-y_0)\cdot(x_e-x_0)-(y_e-y_0)\cdot(x_1-x_0)| \leq T_y \times |(x_e-x_0)|$$
$$|(z_1-z_0)\cdot(x_e-x_0)-(z_e-z_0)\cdot(x_1-x_0)| \leq T_z \times |(x_e-x_0)|$$
else
$$|(y_1-y_0)\cdot(x_e-x_0)-(y_e-y_0)\cdot(x_1-x_0)| \leq T_x \times |(y_e-y_0)|$$
$$|(z_1-z_0)\cdot(y_e-y_0)-(z_e-z_0)\cdot(y_1-y_0)| \leq T_z \times |(y_e-y_0)|$$

For a given patch, this process is performed for non-straight edges (edges with zero bit in the edge flag) of patch. If at least one edge of patch along the s direction and at least one edge along t direction are not straight, the patch is subdivided along the s direction if previous subdivision was along t direction, otherwise subdivision is performed along the t direction. Otherwise, if edges are non-straight along only one of the s or t directions, the patch is subdivided along the non-straight direction. If edges along both the s and t directions are straight, then all the non-edge curves of a patch are tested for straightness. If all the curves of a patch along one direction are straight, patch is called flat along this direction. If a patch is flat along both s and t directions, the patch is classified as flat, otherwise it is subdivided along non-flat direction.

Linearity of Shading

This criterion is based on the linearity of change in the diffuse component of color across a patch classified as flat based on flatness criterion. The control points $D_{ij}, 0 \leq i,j \leq 3$, of the RGB color patch are used for linearly interpolating diffluse color across a patch (the computation of these control points is discussed further below). This criterion is tested after a patch is classified to be flat. This criterion is tested using expressions which are extensions of the previous expressions for the flatness criterion. Let the color value at $S_0$, $S_e$, and $(x_1,y_1,z_1)$ be $d_0$, $d_e$, and $d_1$, respectively. The condition for testing linearity in shading is given by if $|x_e-x_0|>|y_e-y_0|$ then
$$|(d_1-d_0)\cdot(x_e-x_0)-(d_e-d_0)\cdot(x_1-x_0)| \leq T_d \times |(x_e-x_0)|$$
else
$$|(d_1-d_0)\cdot(y_e-y_0)-(d_e-d_0)\cdot(y_1-y_0)| \leq T_d \times |(y_e-y_0)|$$
where $T_d$ is tolerance for color.

Culling

A patch is completely culled if $(g_{i+1,j}.x-g_{i,j}.x, g_{i+1,j}.y-g_{i,j}.y) \times (g_{i,j+1}.x-g_{i,j}.x, g_{i,j+1}.y-g_{i,j}.y) < 0$ for all the control points, where $0 \leq i \leq s\_degree$ and $0 \leq j \leq t\_degree$. If this test holds true, the patch is backfaced and cannot be seen. If the above product is greater than zero for all the control points, it implies that the patch is completely visible. In such cases, a cull flag for the patch is set to zero so that no culling test need be done for any of its subpatches.

Clipping

A patch is completely clipped if none of its control points lies inside the viewing window, i.e. $-(1+\epsilon)<g_{i+1,j}.x<(1+\epsilon)$, $-(1+\epsilon\epsilon)<g_{i+1,j}.y<(1+\epsilon)$, and $-1<g_{i+1,j}.z<0$, for $0 \leq i \leq s\_degree$ and $0 \leq j \leq t\_degree$. On the other hand, if all the control points of a patch lie inside the viewing window, a clip flag for the patch is set to zero, implying no clipping test need be performed for any of its subpatches. Here, $\epsilon$ is a small fraction of image size. For example, for 512×512 image, $\epsilon$ can be set to 1/64, allowing 520×520 viewing space for patch clipping.

Normal Computation

The normal to a surface at a point may be defined as $$N(s,t) = \frac{\partial Q(s,t)}{\partial s} \times \frac{\partial Q(s,t)}{\partial t}$$

Using this definition as a method for computation is undesirable since it is computationally expensive. One division, one square root and number of additions and multiplications would be required in order to compute the normal at each point. To avoid this expensive operation, the normal computation for a patch is instead approximated using Coon's patch. Coon's patch is a bicubic Bezier patch which may be used to approximate a two-dimensional function from samples of the function and its derivatives at the corner points.

The determination of the normal proceeds in the following manner. The components of the above cross product appear as follows:

$$n_x = \frac{\partial}{\partial s}\left(\frac{S \cdot M \cdot G_y \cdot M \cdot T^T}{S \cdot M \cdot G_w \cdot M \cdot T^T}\right) \cdot \frac{\partial}{\partial t}\left(\frac{S \cdot M \cdot G_z \cdot M \cdot T^T}{S \cdot M \cdot G_w \cdot M \cdot T^T}\right) - $$
$$\frac{\partial}{\partial t}\left(\frac{S \cdot M \cdot G_y \cdot M \cdot T^T}{S \cdot M \cdot G_w \cdot M \cdot T^T}\right) \cdot \frac{\partial}{\partial s}\left(\frac{S \cdot M \cdot G_z \cdot M \cdot T^T}{S \cdot M \cdot G_w \cdot M \cdot T^T}\right)$$

$$n_y = \frac{\partial}{\partial s}\left(\frac{S \cdot M \cdot G_z \cdot M \cdot T^T}{S \cdot M \cdot G_w \cdot M \cdot T^T}\right) \cdot \frac{\partial}{\partial t}\left(\frac{S \cdot M \cdot G_x \cdot M \cdot T^T}{S \cdot M \cdot G_w \cdot M \cdot T^T}\right) - $$
$$\frac{\partial}{\partial t}\left(\frac{S \cdot M \cdot G_z \cdot M \cdot T^T}{S \cdot M \cdot G_w \cdot M \cdot T^T}\right) \cdot \frac{\partial}{\partial s}\left(\frac{S \cdot M \cdot G_x \cdot M \cdot T^T}{S \cdot M \cdot G_w \cdot M \cdot T^T}\right)$$

$$n_z = \frac{\partial}{\partial s}\left(\frac{S \cdot M \cdot G_x \cdot M \cdot T^T}{S \cdot M \cdot G_w \cdot M \cdot T^T}\right) \cdot \frac{\partial}{\partial t}\left(\frac{S \cdot M \cdot G_y \cdot M \cdot T^T}{S \cdot M \cdot G_w \cdot M \cdot T^T}\right) - $$
$$\frac{\partial}{\partial t}\left(\frac{S \cdot M \cdot G_x \cdot M \cdot T^T}{S \cdot M \cdot G_w \cdot M \cdot T^T}\right) \cdot \frac{\partial}{\partial s}\left(\frac{S \cdot M \cdot G_y \cdot M \cdot T^T}{S \cdot M \cdot G_w \cdot M \cdot T^T}\right)$$

$$\frac{\partial}{\partial s}, \frac{\partial}{\partial t}, \frac{\partial^2}{\partial s \partial t}$$

of $n_x$, $n_y$, and $n_z$ may then be computed by evaluating derivatives of above equations. Since it is the unit normal vector which is of primary interest, its components are computed as follows:

$$\hat{n}_x(s,t) = \frac{n_x}{\sqrt{n_x^2 + n_y^2 + n_z^2}}$$

For clarity, let $$W(s,t) = \frac{1}{\sqrt{n_{xs2} + n_y^2 + n_z^2}}$$

then the derivatives of the unit normal components are:

$$\frac{\partial \hat{n}_x}{\partial s} = \frac{\partial n_x}{\partial s} \cdot W + \frac{\partial W}{\partial s} \cdot n_x$$

$$\frac{\partial \hat{n}_x}{\partial t} = \frac{\partial n_x}{\partial t} \cdot W + \frac{\partial W}{\partial t} \cdot n_x$$

$$\frac{\partial^2 \hat{n}_x}{\partial s \partial t} = \frac{\partial^2 n_x}{\partial s \partial t} \cdot W + \frac{\partial^2 W}{\partial s \partial t} \cdot n_x + \frac{\partial n_x}{\partial s} \cdot \frac{\partial W}{\partial t} + \frac{\partial W}{\partial s} \cdot \frac{\partial n_x}{\partial t}$$

with the derivatives of W(s,t) given by:

$$\frac{\partial W}{\partial s} = -W^3 \cdot \left( n_x \cdot \frac{\partial n_x}{\partial s} + n_y \cdot \frac{\partial n_y}{\partial s} + n_z \cdot \frac{\partial n_z}{\partial s} \right)$$

$$\frac{\partial W}{\partial t} = -W^3 \cdot \left( n_x \cdot \frac{\partial n_x}{\partial t} + n_y \cdot \frac{\partial n_y}{\partial t} + n_z \cdot \frac{\partial n_z}{\partial t} \right)$$

$$\frac{\partial^2 W}{\partial s \partial t} = \frac{3}{X} \cdot \frac{\partial W}{\partial s} \cdot \frac{\partial W}{\partial t} - W^3 \cdot \left( \frac{\partial n_x}{\partial s} \cdot \frac{\partial n_x}{\partial t} + \frac{\partial n_y}{\partial s} \cdot \frac{\partial n_y}{\partial t} + \frac{\partial n_z}{\partial s} \cdot \frac{\partial n_z}{\partial t} \right) - W^3 \cdot \left( n_x \cdot \frac{\partial^2 n_x}{\partial s \partial t} + n_y \cdot \frac{\partial^2 n_y}{\partial s \partial t} + n_z \cdot \frac{\partial^2 n_z}{\partial s \partial t} \right)$$

With the above equations, the unit normal components and their derivatives can be quickly evaluated at the corner points of the patch. A matrix is formed of the results (only the x component is shown, the other components are similarly obtained):

$$R_x = \begin{bmatrix} \hat{n}_x(0,0) & \hat{n}_x(0,1) & \frac{\partial \hat{n}_x}{\partial t}(0,0) & \frac{\partial \hat{n}_x}{\partial t}(0,1) \\ \hat{n}_x(1,0) & \hat{n}_x(1,1) & \frac{\partial \hat{n}_x}{\partial t}(1,0) & \frac{\partial \hat{n}_x}{\partial t}(1,1) \\ \frac{\partial \hat{n}_x}{\partial s}(0,0) & \frac{\partial \hat{n}_x}{\partial s}(0,1) & \frac{\partial^2 \hat{n}_x}{\partial s \partial t}(0,0) & \frac{\partial^2 \hat{n}_x}{\partial s \partial t}(0,1) \\ \frac{\partial \hat{n}_x}{\partial s}(1,0) & \frac{\partial \hat{n}_x}{\partial s}(1,1) & \frac{\partial^2 \hat{n}_x}{\partial s \partial t}(1,0) & \frac{\partial^2 \hat{n}_x}{\partial s \partial t}(1,1) \end{bmatrix}$$

From this, the Coon's patch approximation is obtained by the following equation:

$$N_x = (s,t) = S \cdot C \cdot R_x \cdot C^T \cdot T^T$$

where $$C = \begin{bmatrix} 2 & -2 & 1 & 1 \\ -3 & 3 & -2 & -1 \\ 0 & 0 & 1 & 0 \\ 1 & 0 & 0 & 0 \end{bmatrix}$$

Diffuse Color Computation

Let the light source be at $(l_x, l_y, l_z)$, then the diffuse color at $(x(s,t), y(s,t), z(s,t))$ is given by $$d(s,t) = \frac{\hat{n}_x(s,t) \cdot L_x(s,t) + \hat{n}_y(s,t) \cdot L_y(s,t) + \hat{n}_z(s,t) \cdot L_z(s,t)}{\sqrt{L_x^2(s,t) + L_y^2(s,t) + L_z^2(s,t)}}$$

where $(L_x(s,t), L_y(s,t), L_z(s,t)) = (l_x - x(s,t), l_y - y(s,t), l_z - z(s,t))$. In a manner similar to the normal vector computation, the above function may be approximated with the Coon's patch technique to avoid computing the diffuse color at each point with the above equation. The following matrix is formed:

$$\text{Diff} = \begin{bmatrix} d(0,0) & d(0,1) & \frac{\partial d}{\partial t}(0,0) & \frac{\partial d}{\partial t}(0,1) \\ d(1,0) & d(1,1) & \frac{\partial d}{\partial t}(1,0) & \frac{\partial d}{\partial t}(1,1) \\ \frac{\partial d}{\partial s}(0,0) & \frac{\partial d}{\partial s}(0,1) & \frac{\partial^2 d}{\partial s \partial t}(0,0) & \frac{\partial^2 d}{\partial s \partial t}(0,1) \\ \frac{\partial d}{\partial s}(1,0) & \frac{\partial d}{\partial s}(1,1) & \frac{\partial^2 d}{\partial s \partial t}(1,0) & \frac{\partial^2 d}{\partial s \partial t}(1,1) \end{bmatrix}$$

and the Coon's patch approximation made:

$$D(s,t) = S \cdot C \cdot \text{Diff} \cdot C^T \cdot T^T$$

where once again $$C = \begin{bmatrix} 2 & -2 & 1 & 1 \\ -3 & 3 & -2 & -1 \\ 0 & 0 & 1 & 0 \\ 1 & 0 & 0 & 0 \end{bmatrix}$$

Half Way Vector Computation

Let the light source be at $(l_x, l_y, l_z)$, and viewing location be at $(v_x, v_y, v_z)$. Next, let
$L(s,t) = (L_x(s,t), L_y(s,t), L_z(s,t)) = (l_x - x(s,t), l_y - y(s,t), l_z - z(s,t))$
and
$V(s,t) = (V_x(s,t), V_y(s,t), V_z(s,t)) = (v_x - x(s,t), v_y - y(s,t), v_z - z(s,t))$, and define the unit vectors $$\hat{L}(s,t) = \frac{L(s,t)}{|L(s,t)|}, \text{ and } \hat{V}(s,t) = \frac{V(s,t)}{|V(s,t)|}.$$

Then the half-way vector at (x(s,t), y(s,t), z(s,t)) is given by $$h(s,t) = \frac{\hat{L}(s,t) + \hat{V}(s,t)}{2}$$

Once again, the Coon's patch technique may be employed:

$$\text{Hvector}_x = \begin{bmatrix} h_x(0,0) & h_x(0,1) & \frac{\partial h_x}{\partial t}(0,0) & \frac{\partial h_x}{\partial t}(0,1) \\ h_x(1,0) & h_x(1,1) & \frac{\partial h_x}{\partial t}(1,0) & \frac{\partial h_x}{\partial t}(1,1) \\ \frac{\partial h_x}{\partial s}(0,0) & \frac{\partial h_x}{\partial s}(0,1) & \frac{\partial^2 h_x}{\partial s \partial t}(0,0) & \frac{\partial^2 h_x}{\partial s \partial t}(0,1) \\ \frac{\partial h_x}{\partial s}(1,0) & \frac{\partial h_x}{\partial s}(1,1) & \frac{\partial^2 h_x}{\partial s \partial t}(1,0) & \frac{\partial^2 h_x}{\partial s \partial t}(1,1) \end{bmatrix}$$

$$H_x(s,t) = S \cdot C \cdot \text{Hvector}_x \cdot C^T \cdot T^T$$

where C is as previously defined.

Reflection Vector Computation

The reflection vector at a point $(x(s,t),y(s,t),z(s,t))$ is given by $$(r_x(s,t),r_y(s,t),r_z(s,t))=2(N(s,t)\cdot V(s,t))\cdot N(s,t)-L(s,t)$$

and may also be approximated with the Coon's patch technique, so that:

$$reflection_x = \begin{bmatrix} r_x(0,0) & r_x(0,1) & \frac{\partial r_x}{\partial t}(0,0) & \frac{\partial r_x}{\partial t}(0,1) \\ r_x(1,0) & r_x(1,1) & \frac{\partial r_x}{\partial t}(1,0) & \frac{\partial r_x}{\partial t}(1,1) \\ \frac{\partial r_x}{\partial s}(0,0) & \frac{\partial r_x}{\partial s}(0,1) & \frac{\partial^2 r_x}{\partial s \partial t}(0,0) & \frac{\partial^2 r_x}{\partial s \partial t}(0,1) \\ \frac{\partial r_x}{\partial s}(1,0) & \frac{\partial r_x}{\partial s}(1,1) & \frac{\partial^2 r_x}{\partial s \partial t}(1,0) & \frac{\partial^2 r_x}{\partial s \partial t}(1,1) \end{bmatrix}$$

$$Ref_x(s,t) = S \cdot C \cdot reflection_x \cdot C^T \cdot T^T$$

As before, the y and z components are computed in a similar fashion.

Numerous variations and modifications will become apparent to those skilled in the art once athe above disclosure is fully appreciated. For example, rational Bezier patches according to equation 10 may be used wherever Bezier patches are mentioned in this description. It is intended that the following claims be interpreted to embrace all such variations and modifications.

What is claimed is:

1. A method for rendering a Bezier surface patch which describes a portion of an object, wherein said surface patch has an original set of control points, comprising:
   testing the surface patch for flatness; and
   if the surface patch is not flat:
     generating a second set of control points for a left subpatch from the original set of control points;
     rendering the left subpatch;
     generating a third set of control points for a right subpatch from the second set of control points;
     rendering the right subpatch;
     generating the original set of control points from the third set of control points; and
   if the surface patch is flat:
     converting the surface patch into triangles; and
     presenting said triangles on a graphics display.

2. The method of claim 1, wherein said rendering of said left and right subpatches is recursively accomplished by performing said testing, generating, rendering and converting on both said left and right subpatches.

3. The method of claim 1, wherein said second set of control points $L_{0i}$, $L_{1i}$, $L_{2i}$, $L_{3i}$, $0 \leq i \leq 3$, is generated from the original set of control points $P_{0i}$, $P_{1i}$, $P_{2i}$, $P_{3i}$, $0 \leq i \leq 3$, according to the equations $L_{0i}=P_{0i}$, $L_{1i}=(P_{0i}+P_{1i})/2$, $L_{2i}=(P_{0i}+2P_{1i}+P_{2i})/4$, and $L_{3i}=(P_{0i}+3P_{1i}+3P_{2i}+P_{3i})/8$ for $0 \leq i \leq 3$.

4. The method of claim 1, wherein said second set of control points $L_{0i}$, $L_{1i}$, $L_{2i}$, $L_{3i}$, $0 \leq i \leq 3$, is generated from the original set of control points $P_{0i}$, $P_{1i}$, $P_{2i}$, $P_{3i}$, $0 \leq i \leq 3$, using intermediate values $M_{1i}$, $N_{1i}$, $M_{2i}$, $0 \leq i \leq 3$, by a plurality of operations comprising $L_{0i}=P_{0i}$, $L_{1i}=(P_{0i}+P_{1i})/2$, $M_{1i}=(P_{1i}+P_{2i})/2$, $N_{1i}=(P_{2i}+P_{3i})/2$, $L_{2i}=(L_{1i}+M_{1i})/2$, $M_{2i}=(M_{1i}+N_{1i})/2$, $L_{3i}=(L_{2i}+M_{2i})/2$, for $0 \leq i \leq 3$.

5. The method of claim 1, wherein said third set of control points $R_{0i}$, $R_{1i}$, $R_{2i}$, $R_{3i}$, $0 \leq i \leq 3$, is generated from the second set of control points $L_{0i}$, $L_{1i}$, $L_{2i}$, $L_{3i}$, $0 \leq i \leq 3$, according to the equations $R_{0i}=L_{3i}$, $R_{1i}=-L_{2i}+2L_{3i}$, $R_{2i}=L_{1i}-4L_{2i}+4L_{3i}$, and $R_{3i}=-L_{0i}+6L_{1i}-12L_{2i}+8L_{3i}$ for $0 \leq i \leq 3$.

6. The method of claim 1, wherein said third set of control points $R_{0i}$, $R_{1i}$, $R_{2i}$, $R_{3i}$, $0 \leq i \leq 3$, is generated from the second set of control points $L_{0i}$, $L_{1i}$, $L_{2i}$, $L_{3i}$, $0 \leq i \leq 3$, using intermediate values $M_{1i}$, $N_{1i}$, $M_{2i}$, $0 \leq i \leq 3$, by a plurality of operations comprising $R_{0i}=L_{3i}$, $R_{1i}=2L_{3i}-L_{2i}$, $M_{1i}=2L_{2i}-L_{1i}$, $N_{1i}=2L_{1i}-L_{0i}$, $R_{2i}=2R_{1i}-M_{1i}$, $M_{2i}=2M_{1i}-N_{1i}$, $R_{3i}=2R_{2i}-M_{2i}$, for $0 \leq i \leq 3$.

7. The method of claim 1, wherein said generation of the original set of control points $P_{0i}$, $P_{1i}$, $P_{2i}$, $P_{3i}$, $0 \leq i \leq 3$, from the third set of control points $R_{0i}$, $R_{1i}$, $R_{2i}$, $R_{3i}$, $0 \leq i \leq 3$, is determined according to the equations $P_{3i}=R_{3i}$, $P_{2i}=-R_{3i}+2R_{2i}$, $P_{1i}=R_{3i}-4R_{2i}+4R_{1i}$, and $P_{0i}=-R_{3i}+6R_{2i}-12R_{1i}+8R_{0i}$ for $0 \leq i \leq 3$.

8. The method of claim 1, wherein said generation of the original set of control points $P_{0i}$, $P_{1i}$, $P_{2i}$, $P_{3i}$, $0 \leq i \leq 3$, from the third set of control points $R_{0i}$, $R_{1i}$, $R_{2i}$, $R_{3i}$, $0 \leq i \leq 3$, is determined using mediate values $M_{1i}$, $N_{1i}$, $M_{2i}$, $0 \leq i \leq 3$, by a plurality of operations comprising $P_{3i}=R_{3i}$, $P_{2i}=-R_{3i}+2R_{2i}$, $M_{1i}=-R_{2i}+2R_{1i}$, $N_{1i}=-R_{1i}+2R_{0i}$, $P_{1i}=-P_{2i}+2M_{1i}$, $M_{2i}=-M_{1i}+2N_{1i}$, $P_{0i}=-P_{1i}2M_{2i}$, for $0 \leq i \leq 3$.

9. The method of claim 1, wherein the generation of said second set of control points from said original set of control points is implemented to provide fixed point results, and wherein bits that are truncated from said second set of control points are stored for use in the generation of said third set of control points.

10. The method of claim 9, wherein said generation of said third set of control points is preceded by restoring said truncated bits to said second set of control points.

11. The method of claim 1, wherein said generation of said third set of control points from said second set of control points is implemented to provide fixed point results, and wherein bits that are truncated from said third set of control points are stored for use in the generation of said original set of control points.

12. The method of claim 11, wherein said generation of said original set of control points is preceded by restoring said bits that are truncated from the third set of control points to said third set of control points.

13. The method of claim 2, wherein said patches have curves along a first axis and curves along a second axis, wherein said generation of the second set of control points for a left subpatch is (1) performed for curves along the first axis if the patch tests as fat along the second axis, (2) performed for curves along the second axis if the patch tests as flat along the first axis, (3) performed for curves along the first axis if the patch tests as not-flat along the first axis and a prior generation of the second set of control points was not along the first axis, and (4) performed for curves along the second axis if the patch tests as not-flat along the second axis and a prior generation of the second set of control points was along the first axis.

14. The method of claim 1, wherein the testing for flatness is preceded by a determination of patch orientation, and wherein the surface patch is discarded if the surface patch has a backfaced orientation.

15. The method of claim 14, wherein the surface patch has control points having x and y coordinates $(g_{ij}.x, g_{ij}.y)$ $0 \leq i,j \leq N$, and wherein the surface patch is determined to have a backfaced orientation by evaluating the relation $$(g_{i+1,j}.x-g_{i,j}.x, g_{i+1,j}.y-g_{i,j}.y) \times (g_{i,j+1}.x-g_{i,j}.x, g_{i,j+1}.y-g_{i,j}.y)<0$$

to be true for $0 \leq i,j < N$.

16. The method of claim 1, wherein the testing for flatness is preceded by a determination of patch location, and wherein the surface patch is discarded if the surface patch has a location external to a viewing window.

17. The method of claim 16, wherein the surface patch has control points having x, y, and z coordinates ($g_{i,j}.x$, $g_{i,j}.y$, $g_{i,j}.z$) $0 \leq i,j \leq N$, wherein $\epsilon$ is a predetermined fraction of the viewing window size, and wherein the surface patch is determined to have a location external to the viewing window by determining that not all of the following relations are jointly true:

$-(1+\epsilon) < g_{ij}.x < (1+\epsilon)$,
$-(1+\epsilon) < g_{ij}.y < (1+\epsilon)$, and
$-1 < g_{ij}.z < 0$ for all combinations of i and j.

18. The method of claim 1, wherein said testing for flatness comprises determining straightness of Bezier curves within the Bezier surface patch, wherein said Bezier curves have end points and intermediate control points, and wherein said determination of straightness includes:

determining a horizontal distance between the end points; and determining a vertical distance between the end points; and comparing the horizontal distance to the vertical distance; and if the horizontal distance is greater than the vertical distance,
  comparing a vertical resolution to vertical deviations of the intermediate control points from a straight line between the end points; and
  determining that the curve is not straight if any of the vertical deviations exceeds the vertical resolution; and if the horizontal distance is less than the vertical distance,
  comparing a horizontal resolution to horizontal deviations of the intermediate control points from a straight line between the end points; and
  determining that the curve is not straight if any of the horizontal deviations exceeds the horizontal resolution.

19. The method of claim 18, wherein said determination of straightness further includes:

if the horizontal distance is greater than the vertical distance,
  comparing a perpendicular resolution to first perpendicular deviations of the intermediate control points from a straight line between the end points; and
  determining that the curve is not straight if any of the first perpendicular deviations exceeds the perpendicular resolution; and if the horizontal distance is less than the vertical distance,
  comparing the perpendicular resolution to second perpendicular deviations of the intermediate control points from a straight line between the end points; and
  determining that the curve is not straight if any of the second perpendicular deviations exceeds the perpendicular resolution.

20. The method of claim 1, wherein said testing for flatness includes determining straightness of Bezier curves within a diffluse color patch associated with the surface patch.

21. The method of claim 20, wherein said Bezier curves have end points and intermediate control points, and wherein said determination of straightness includes:

determining a horizontal distance between the end points; and determining a vertical distance between the end points; and comparing the horizontal distance to the vertical distance; and if the horizontal distance is greater than the vertical distance,
  comparing a color resolution to first color deviations of the intermediate control points from a straight line between the end points; and
  determining that the curve is not straight if any of the color deviations exceeds the color resolution; and if the horizontal distance is less than the vertical distance,
  comparing a color resolution to second color deviations of the intermediate control points from a straight line between the end points; and
  determining that the curve is not straight if any of the color deviations exceeds the color resolution.

22. A device for converting a Bezier surface patch having an original set of control points to a plurality of triangles for display, comprising:

a floating point unit configured to receive said control points, wherein said floating point unit is also configured to apply a desired transformation to said control points;

a patch tessellator coupled to receive said transformed control points and configured to responsively produce a set of triangles which approximate said patch; and a rasterizer coupled to receive said said triangles and responsively produce pixel data for an image of said patch;

wherein said patch tessellator is configured to (a) test the surface patch for flatness; and
  if the surface patch is not flat:
    (b) generate a second set of control points for a left subpatch from the transformed control points to generate the left subpatch;
    (c) generate a third set of control points for a right subpatch from the second set of control points to generate the right subpatch;
    (d) generate the transformed control points from the third set of control points; and
  if the surface patch is flat:
    (e) convert the surface patch into triangles.

23. The device of claim 22, wherein said patch tessellator is further configued to generate the left and right subpatches by iteratively performing steps (a) on a subpatch and (b), (c), (d) on the subpatch if the subpatch is not flat and (e) on the subpatch if the subpatch is flat, wherein said iteration occurs for the left and right subpatches and any new subpatches which are identified by performing steps (b) and (c).

24. The device of claim 22, wherein said patch tessellator generates said second set of control points $L_{0i}$, $L_{1i}$, $L_{2i}$, $L_{3i}$, $0 \leq i \leq 3$, from the transformed control points $P_{0i}$, $P_{1i}$, $P_{2i}$, $P_{3i}$, $0 \leq i \leq 3$, according to the equations $L_{0i}=P_{0i}$, $L_{1i}=(P_{0i}+P_{1i})/2$, $L_{2i}=(P_{0i}+2P_{1i}+P_{2i})/4$, and $L_{3i}=(P_{0i}+3P_{1i}+3P_{2i}+P_{3i})/8$ for $0 \leq i \leq 3$.

25. The device of claim 22, wherein said patch tessellator generated said third set of control points $R_{0i}$, $R_{1i}$, $R_{2i}$, $R_{3i}$, $0 \leq i \leq 3$, from the second set of control points $L_{0i}$, $L_{1i}$, $L_{2i}$, $L_{3i}$, $0 \leq i \leq 3$, according to the equations $R_{0i}=L_{3i}$, $R_{1i}=-L_{2i}+2L_{3i}$, $R_{2i}=L_{1i}-4L_{2i}+4L_{3i}$, and $R_{3i}=-L_{0i}+6L_{1i}-12L_{2i}+8L_{3i}$ for $0 \leq i \leq 3$.

26. The device of claim 22, wherein said generation of the transformed control points $P_{0i}$, $P_{1i}$, $P_{2i}$, $P_{3i}$, $0 \leq i \leq 3$, from the third set of control points $R_{0i}$, $R_{1i}$, $R_{2i}$, $R_{3i}$, $0 \leq i \leq 3$, is determined by the patch tessellator according to the equations $P_{3i}=R_{3i}$, $P_{2i}=-R_{3i}+2R_{2i}$, $P_{1i}=R_{3i}-4R_{2i}+4R_{1i}$, and $P_{0i}=-R_{3i}+6R_{2i}-12R_{1i}+8R_{0i}$ for $0 \leq i \leq 3$.

27. The device of claim 22, wherein said patch tessellator operates only on fixed point data, and wherein said patch tessellator stores bits that are truncated from said second set of control points, and wherein said patch tessellator restores said truncated bits to said second set of control points prior to generating said third set of control points.

28. The device of claim 22, wherein said patch tessellator operates only on fixed point data, and wherein said patch tessellator stores bits that are truncated from said third set of control points, and wherein said patch tessellator restores said truncated bits to said third set of control points prior to generating said transformed control points.

29. The device of claim 23, wherein said patches have curves along a first axis and curves along a second axis, and wherein said patch tessellator generates the second set of control points for a left subpatch is (1) for curves along the first axis if the patch tests as flat along the second axis, (2) for curves along the second axis if the patch tests as flat along the first axis, (3) for curves along the first axis if the patch tests as not-flat along the first axis and a prior generation of the second set of control points was not along the first axis, and (4) for curves along the second axis if the patch tests as not-flat along the second axis and a prior generation of the second set of control points was along the first axis.

30. The device of claim 22, wherein prior to testing for flatness the patch tessellator discards the patch if the patch tessellator determines that the patch has a backfaced orientation.

31. The device of claim 22, wherein prior to testing for flatness, the patch tessellator discards the patch if the patch tessellator determines that the surface patch has a location external to a viewing window.

32. The device of claim 22, wherein said the patch tessellator is configured to test for flatness by determining straightness of Bezier curves within the surface patch, wherein said Bezier curves have end points and intermediate control points, and wherein said patch tessellator is configured to perform the determination of straightness by:

determining a horizontal distance between the end points; and determining a vertical distance between the end points; and comparing the horizontal distance to the vertical distance; and if the horizontal distance is greater than the vertical distance,
comparing a vertical resolution to vertical deviations of the intermediate control points from a straight line between the end points; and
determining that the curve is not straight if any of the vertical deviations exceeds the vertical resolution; and if the horizontal distance is less than the vertical distance,
comparing a horizontal resolution to horizontal deviations of the intermediate control points from a straight line between the end points; and
determining that the curve is not straight if any of the horizontal deviations exceeds the horizontal resolution.

33. The device of claim 22, wherein the floating point unit is further configured to determine one or more attribute patches for said surface patch, wherein said one or more attribute patches include a diffuse color patch.

34. The device of claim 33, wherein the patch tessellator is configured to test for flatness by determining straightness of Bezier curves within the diffuse color patch associated with the surface patch.

35. The device of claim 34, wherein said Bezier curves have end points and intermediate control points, and wherein the patch tessellator performs the determination of straightness by:

determining a horizontal distance between the end points; and determining a vertical distance between the end points; and comparing the horizontal distance to the vertical distance; and if the horizontal distance is greater than the vertical distance,
comparing a color resolution to first color deviations of the intermediate control points from a straight line between the end points; and
asserting that the curve is not straight if any of the color deviations exceeds the color resolution; and if the horizontal distance is less than the vertical distance,
comparing a color resolution to second color deviations of the intermediate control points from a straight line between the end points; and
asserting that the curve is not straight if any of the color deviations exceeds the color resolution.

36. A method for rendering a Bezier surface patch which describes a portion of an object, wherein said Bezier surface patch includes Bezier curves which are to be tested for straightness, wherein said Bezier curves have end points and intermediate control points, and wherein said method comprises:

determining a horizontal distance between the end points; and determining a vertical distance between the end points; and comparing the horizontal distance to the vertical distance; and if the horizontal distance is greater than the vertical distance,
comparing a vertical resolution to vertical deviations of the intermediate control points from a straight line between the end points; and
determining that the curve is not straight if any of the vertical deviations exceeds the vertical resolution; and if the horizontal distance is less than the vertical distance,
comparing a horizontal resolution to horizontal deviations of the intermediate control points from a straight line between the end points; and
determining that the curve is not straight if any of the horizontal deviations exceeds the horizontal resolution.

37. The method of claim 36, further comprising:

if the horizontal distance is greater than the vertical distance,
comparing a perpendicular resolution to first perpendicular deviations of the intermediate control points from a straight line between the end points; and
asserting that the curve is not straight if any of the first perpendicular deviations exceeds the perpendicular resolution; and if the horizontal distance is less than the vertical distance,
comparing the perpendicular resolution to second perpendicular deviations of the intermediate control points from a straight line between the end points; and asserting that the curve is not straight if any of the second perpendicular deviations exceeds the perpendicular resolution.

38. A storage medium configured to provide instructions for patch tessellation to a graphics display system, wherein patches to be tessellated include Bezier curves which are to be tested for straightness, wherein said Bezier curves have end points and intermediate control points, and wherein said instructions comprise:

determining a horizontal distance between the end points; and determining a vertical distance between the end points; and comparing the horizontal distance to the vertical distance; and if the horizontal distance is greater than the vertical distance,
comparing a vertical resolution to vertical deviations of the intermediate control points from a straight line between the end points; and
determining that the curve is not straight if any of the vertical deviations exceeds the vertical resolution; and if the horizontal distance is less than the vertical distance,
comparing a horizontal resolution to horizontal deviations of the intermediate control points from a straight line between the end points; and
determining that the curve is not straight if any of the horizontal deviations exceeds the horizontal resolution.

39. A mehod for rendering a Bezier surface patch on a display having a horizontal resolution $T_x$ and a vertical resolution $T_y$, wherein said Bezier surface patch describes a portion of an object, wherein said Bezier surface patch includes a Bezier curve which is to be tested for straightness, wherein said Bezier curve has end points $(x_0,y_0)$, $(x_e,y_e)$ and intermediate control points $(x_i,y_i)$, $0<i<e$, and wherein said method comprises:

determining a horizontal distance $|x_e-x_0|$; and determining a vertical distance $|y_e-y_0|$; and comparing the horizontal distance to the vertical distance; and if the horizontal distance is greater than the vertical distance,
comparing deviation quantities $|(y_i-y_0)(x_e-x_0)-(y_e-y_0)(x_i-x_0)|$, $0<i<e$, to a vertical resolution quantity $T_y|(x_e-x_0)|$; and
determining that the curve is straight if none of the deviation quantities exceeds the vertical resolution quantity; and if the horizontal distance is less than the vertical distance,
comparing deviation quantities $|(y_i-y_0)(x_e-x_0)-(y_e-y_0)(x_i-x_0)|$, $0<i<e$, to a horizontal resolution quantity $T_x|(y_e-y_0)|$; and
determining that the curve is straight if none of the deviation quantities exceeds the horizontal resolution quantity.

40. A method for rendering a Bezier surface patch on a display using a horizontal resolution $T_x$, a vertical resolution $T_y$, and a perpendicular resolution $T_z$, wherein said Bezier surface patch describes a portion of an object, wherein said Bezier surface patch includes a three-dimensional Bezier curve which is to be tested for straightness, wherein said Bezier curve has end points $(x_0,y_0,z_0)$, $(x_e,y_e,z_e)$ and intermediate control points $(x_i,y_i,z_i)$, $0<i<e$, and wherein said method comprises:

determining a horizontal distance $|x_e-x_0|$; and determining a vertical distance $|y_e-y_0|$; and comparing the horizontal distance to the vertical distance; and if the horizontal distance is greater than the vertical distance,
comparing deviation quantities $|(y_i-y_0)(x_e-x_0)-(y_e-y_0)(x_i-x_0)|$, $0<i<e$, to a vertical resolution quantity $T_y|(x_e-x_0)|$; and
comparing first perpendicular deviation quantities $|(z_i-z_0)(x_e-x_0)-(z_e-z_0)(x_i-x_0)|$, $0<i<e$, to a first perpendicular resolution quantity $T_z|(x_e-x_0)|$; and
determining that the curve is straight if none of the deviation quantities exceeds the vertical resolution quantity and none of the first perpendicular deviation quantities exceeds the first perpendicular resolution quantity; and if the horizontal distance is less than the vertical distance,
comparing deviation quantities $|(y_i-y_0)(x_e-x_0)-(y_e-y_0)(x_i-x_0)|$, $0<i<e$, to a horizontal resolution quantity $T_x|(y_e-y_0)|$; and
comparing second perpendicular deviation quantities $|(z_i-z_0)(y_e-y_0)-(z_e-z_0)(y_i-y_0)|$, $0<i<e$, to a second perpendicular resolution quantity $T_z|(y_e-y_0)|$; and
determmining that the curve is straight if none of the deviation quantities exceeds the horizontal resolution quantity and none of the first perpendicular deviation quantities exceeds the first perpendicular resolution quantity.

41. A method for rendering a color Bezier surface patch which describes a portion of an object, wherein said Bezier surface patch has an associated diffuse color Bezier patch, wherein said method comprises determining straightness of Bezier curves within the diffluse color Bezier patch.

42. The method of claim 41, further comprising determining the diffuse color Bezier patch prior to determining the straightness of Bezier curves within the diffuse color patch.

43. The method of claim 41, further comprising determining a Coon's patch approximation of the diffuse color Bezier patch.

44. The method of claim 41, wherein said Bezier curves have end points and intermediate control points, and wherein said determination of straightness includes:

determining a horizontal distance between the end points; and determining a vertical distance between the end points; and comparing the horizontal distance to the vertical distance; and if the horizontal distance is greater than the vertical distance,
comparing a color resolution to first color deviations of the intermediate control points from a straight line between the end points; and
asserting that the curve is not straight if any of the color deviations exceeds the color resolution; and if the horizontal distance is less than the vertical distance,
comparing a color resolution to second color deviations of the intermediate control points from a straight line between the end points; and
asserting that the curve is not straight if any of the color deviations exceeds the color resolution.

45. A method for rendering a surface patch having an associated color patch, wherein said surface patch represents a portion of an object, said method comprising:

testing the surface patch for flatness; and if the surface patch is flat, testing the associated color patch for linearity of shading of the surface patch; and if the surface patch is linearly shaded, converting the surface patch into triangles; and if the surface patch is not flat or if the surface patch is not linearly shaded, dividing the surface patch and associated color patch into surface subpatches with associated color subpatches.

46. The method of claim 45, further comprising:

recursively performing said testing the surface patch for flatness, said testing the associated color patch for linearity of shading if the surface patch is flat, said converting the surface patch into triangles if the surface patch is linearly shaded, and said dividing the surface patch and associated color patch into surface subpatches with associated color subpatches otherwise.

47. The method of claim 45, wherein said testing for flatness determines that the surface patch is flat if all curves which form the surface patch do not deviate from straight lines by more than a predetermined tolerance.

48. The method of claim 45, wherein said testing for linearity of shading determines that the surface patch is linearly shaded if all curves which form the associated color patch do not deviate from straight lines by more than a predetermined tolerance.

49. The method of claim 45, wherein the testing for flatness is preceded by determining an orientation of said surface patch, and wherein said surface patch is discarded if the surface patch is backfaced.

50. The method of claim 49, wherein the testing for flatness is preceded by determining a location of said surface patch, and wherein said surface patch is discarded if the surface patch has a location external to a viewing window.

* * * * *